(12) United States Patent
Kachare et al.

(10) Patent No.: US 12,346,257 B2
(45) Date of Patent: Jul. 1, 2025

(54) SYSTEMS AND METHODS FOR PROCESSING STORAGE TRANSACTIONS

(71) Applicant: Samsung Electronics Co., Ltd., Suwon-si (KR)

(72) Inventors: Ramdas P. Kachare, Pleasanton, CA (US); Jimmy Lau, Santa Clara, CA (US); Tinh Lac, Manteca, CA (US); Mounica Behara, San Jose, CA (US); Vinit Apte, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 17/965,545

(22) Filed: Oct. 13, 2022

(65) Prior Publication Data

US 2024/0078183 A1    Mar. 7, 2024

Related U.S. Application Data

(60) Provisional application No. 63/404,474, filed on Sep. 7, 2022.

(51) Int. Cl.
*G06F 12/0846* (2016.01)
*G06F 12/1081* (2016.01)

(52) U.S. Cl.
CPC ...... *G06F 12/0848* (2013.01); *G06F 12/1081* (2013.01)

(58) Field of Classification Search
CPC .......................... G06F 12/0848; G06F 12/1081
See application file for complete search history.

(56) References Cited

U.S. PATENT DOCUMENTS

| | | | |
|---|---|---|---|
| 7,849,252 B2 | 12/2010 | Wagh et al. | |
| 9,098,415 B2 * | 8/2015 | Ajanovic | G06F 1/3203 |
| 9,424,219 B2 | 8/2016 | Saghi et al. | |
| 10,585,819 B2 | 3/2020 | Kachare et al. | |
| 10,659,555 B2 | 5/2020 | Pope et al. | |
| 10,761,996 B2 | 9/2020 | Shanbhogue et al. | |
| 11,200,180 B2 | 12/2021 | Benisty | |
| 11,216,396 B2 | 1/2022 | Schmisseur et al. | |
| 2013/0173834 A1 | 7/2013 | Glaser et al. | |

(Continued)

FOREIGN PATENT DOCUMENTS

WO    WO 2015/155997 A1    10/2015

OTHER PUBLICATIONS

"PCI Express Base Specification Revision 3.0," Peripheral Component Interconnect Special Interest Group, PCI Express, Nov. 10, 2010, XP040726516, 860 pages.

(Continued)

*Primary Examiner* — Baboucarr Faal
(74) *Attorney, Agent, or Firm* — Lewis Roca Rothgerber Christie LLP (57) ABSTRACT

Systems and methods for processing storage transactions are disclosed. A transaction between a storage device and a host computing device is identified. The storage device determines that the transaction satisfies a criterion, and inserts data into a packet associated with the transaction. The data may be for identifying a memory subsystem of the host computing device. The storage device transmits the packet, including the data, to the host computing device for storing the packet in the memory subsystem based on the data.

18 Claims, 5 Drawing Sheets

(56) References Cited

U.S. PATENT DOCUMENTS

| | | |
|---|---|---|
| 2013/0346655 A1 | 12/2013 | Glaser |
| 2019/0042155 A1 | 2/2019 | Ooi et al. |
| 2019/0228145 A1 | 7/2019 | Shanbhogue et al. |
| 2020/0296099 A1* | 9/2020 | Shanbhogue ......... H04L 9/0631 |
| 2020/0371914 A1 | 11/2020 | Wang et al. |
| 2021/0405913 A1* | 12/2021 | Stonelake ........... G06F 11/3037 |

OTHER PUBLICATIONS

EPO Extended European Search Report dated Feb. 8, 2024, issued in corresponding European Patent Application No. 23192347.5 (12 pages).

* cited by examiner

SYSTEMS AND METHODS FOR PROCESSING STORAGE TRANSACTIONS

CROSS-REFERENCE TO RELATED APPLICATION(S)

This application claims priority to and the benefit of U.S. Provisional Patent Application No. 63/404,474 filed in the United States Patent and Trademark Office on Sep. 7, 2022, entitled "SYSTEM AND METHOD OF INSERTING TPH IN STORAGE TRANSACTIONS OF INTEREST IN A SSD CONTROLLER AGNOSTIC MANNER," the entire disclosure of which is incorporated by reference herein.

FIELD

One or more aspects of embodiments according to the present disclosure relate to storage transactions, and more particularly, to reducing access delays of data provided during the storage transactions.

BACKGROUND

Data associated with a storage transaction may be stored in different subsystems of a host's memory, such as a random access memory (RAM), cache, and the like. It may be desirable to efficiently access such data. However, the memory subsystem that stores the data may affect the access time.

The above information disclosed in this Background section is only for enhancement of understanding of the background of the present disclosure, and therefore, it may contain information that does not form prior art.

SUMMARY

One or more embodiments of the present disclosure are directed to a method for processing storage transactions. The method includes identifying a transaction between a storage device and a host computing device. The storage device determines that the transaction satisfies a criterion, and inserts data into a packet associated with the transaction. The data may be for identifying a memory subsystem of the host computing device. The storage device transmits the packet, including the data, to the host computing device for storing the packet in the memory subsystem based on the data.

According to some embodiments, the transaction adheres to a storage interface protocol for transferring the packet using direct memory access.

According to some embodiments, the storage interface protocol is a non-volatile memory express (NVMe) protocol.

According to some embodiments, the method includes performing a write address translation based on the data.

According to some embodiments, the criterion is identification of a type of transaction.

According to some embodiments, the criterion is satisfied in response to identifying the type of transaction as a transaction for writing data retrieved from the storage device, or for writing input/output command completion related data structures.

According to some embodiments, the criterion is identification of a parameter associated with the storage device. The parameter may be a status of the storage device or an identifier of a component used by the storage device.

According to some embodiments, the data includes bits for identifying the memory subsystem.

According to some embodiments, the packet is a translation layer packet (TLP), and the data includes a TLP processing hint (TPH) inserted into a header of the TLP.

According to some embodiments, the memory subsystem includes a portion of a cache memory.

One or more embodiments of the present disclosure are also directed to a storage device including a non-volatile memory device and one or more embedded processors. The one or more embedded processors respectively include logic for: identifying a transaction with a host computing device; determining that the transaction satisfies a criterion; inserting data into a packet associated with the transaction, wherein the data is for identifying a memory subsystem of the host computing device; and transmitting the packet, including the data, to the host computing device for storing the packet into the memory subsystem based on the data.

As a person of skill in the art should recognize, embodiments of the present disclosure help reduce access delays of data provided during a storage transaction.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

Data associated with a storage transaction may be stored in different types and subsystems of the memory of a host device, depending on the frequency of use of the data. For example, data from a storage device that is accessed often may be stored in portion of the cache memory, whereas data that is accessed less often may be stored in a main memory (e.g., RAM). The cache memory itself may be organized hierarchically into different levels or subsystems. For example, a level one (L1) cache may be used to store more-frequently accessed data, while a level two (L2) cache or a last level cache (LLC) may be used to store less-frequently accessed data.

One of the factors that determines productivity of a system is the efficiency of data retrieval from a target device (e.g., a storage device). It may be desirable to store the data that is retrieved from the target device, into an appropriate cache level. Doing so may allow the cache memory to be used in a more optimal manner, and reduce system memory access which may delay access to the data.

In general terms, embodiments of the present disclosure are directed to processing storage transactions to reduce access delays of data associated with the storage transactions. In this regard, a processor within a storage device monitors the storage transactions, and inserts a hint or tag, into a packet of a certain ones of the transactions. The hint may help identify an appropriate host memory subsystem where the packet is to be stored. The host memory subsystem may be, for example, a cache. The hint may be used by the host computing device to place the packet into an appropriate memory subsystem. For example, if the packet contains data that may be frequently accessed, it may be stored into a memory subsystem with relatively high bandwidth and/or low latency. An application running on the host may quickly access the data in the packet to generate an output.

Figure 1:
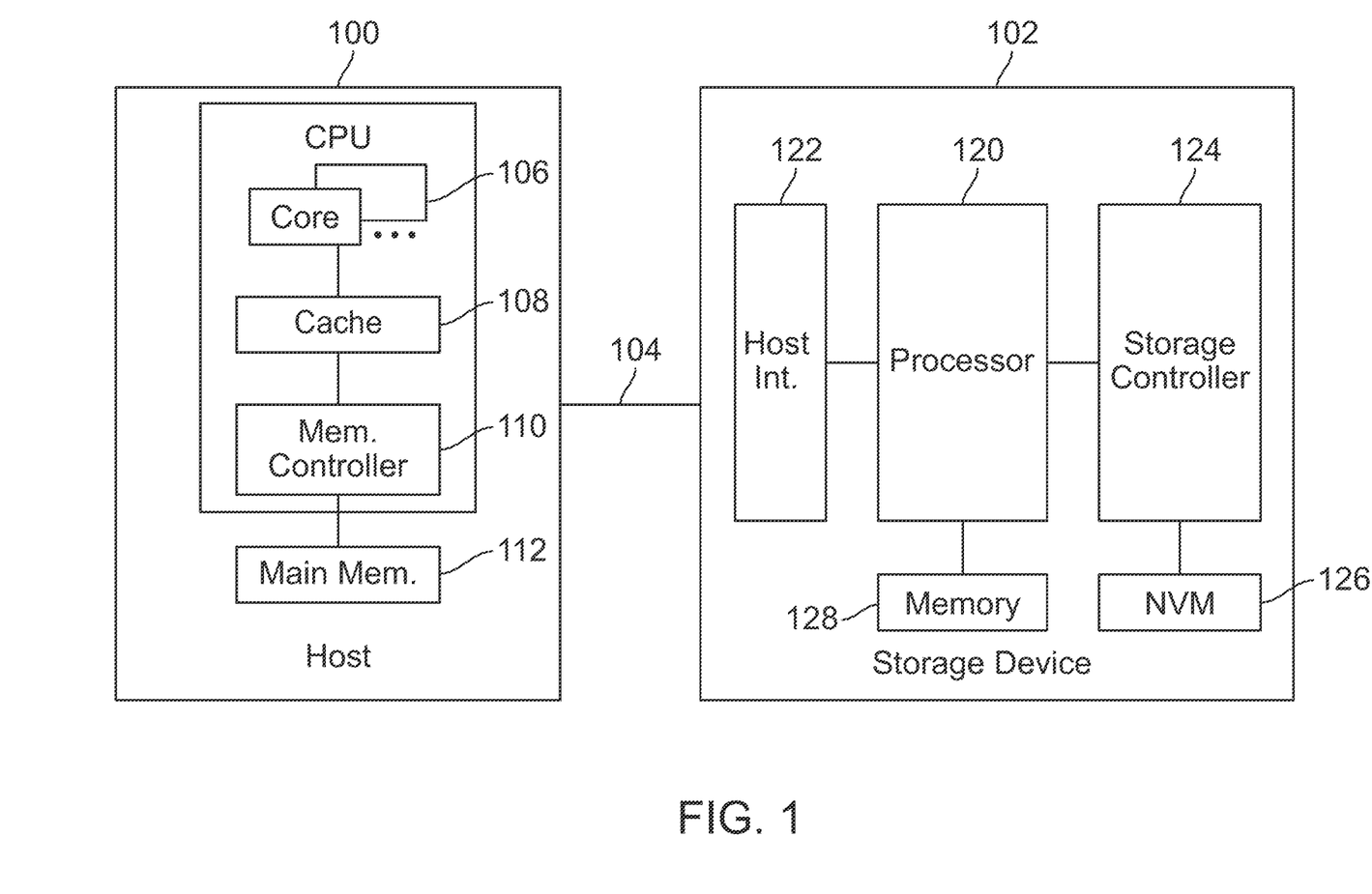
FIG. 1 is a block diagram of a computer system for processing storage transactions according to one embodiment.

FIG. 1 is a block diagram of a computer system for processing storage transactions according to one embodiment. The system may include a host computing device ("host") 100 coupled to a computational storage device ("storage device") 102 over a wired or wireless storage interface 104 including Ethernet, fiber channel, and/or other storage interface. The host 100 may engage in transactions with the storage device 102 over the storage interface 104, using a storage interface protocol. The storage interface protocol may be, for example, a non-volatile memory express (NVMe) protocol. The NVMe protocol is used as an example for purposes of describing the present embodiments. A person of skill in the art should understand, however, that the various embodiments will extend to other current or future storage interface protocols that use a Peripheral Component Interconnect (PCI) or PCI-Express (PCIe) as a communication link, without departing from the spirit and scope of the inventive concept.

In one embodiment, the host 100 includes one or more central processing unit (CPU) cores 106 (also simply referred to as "processors") configured to execute computer program instructions and process data stored in a cache memory 108 (also simply referred to as "memory" or "cache"). The cache memory 108 may be dedicated to one of the CPU cores 106, or shared by various ones of the CPU cores.

The cache memory 108 may include, for example, a level one cache (L1) coupled to level two cache (L2) coupled to a last level cache (LLC). The LLC cache may in turn be coupled to a memory controller 110 which in turn is coupled to a main memory 112. The main memory 112 may include, for example, a dynamic random access memory (DRAM) storing computer program instructions and/or data (collectively referenced as data) that may generated by the storage device 102.

In order for an application of the host 100 to use data generated by the storage device 102, the data may be loaded into the cache memory 108, and the application may consume the data directly from the cache memory. If the data to be consumed is not already in the cache, the application may need to query other memory devices in the memory hierarchy to find the data. For example, if the data that is sought is not in the L1 cache, the application may query the L2 cache, and if not in the L2 cache, query the LLC cache, and if not in the LLC cache, query the DRAM.

In one embodiment, the data produced by the storage device 102 is stored directly in the cache memory 108 (e.g. L2 cache or LLC cache), bypassing the main memory 112. A direct cache access mechanism such as a data direct I/O (DDIO) or cache direct memory access (CDMA) may be used to write data directly into the cache. Use of a direct cache access mechanism may help avoid data access latency that is typical with DRAM accesses. In addition, identifying an appropriate cache in which to store data produced by the storage device 102 may further avoid data access latencies while optimizing use of limited cache memory space.

The storage device 102 may be a solid state drive (SSD) with an embedded processor 120 such as a field programmable gate array (FPGA). In some embodiments, the embedded processor 120 may be a graphics processing unit (GPU), a tensor processing unit (TPU), another application-specific integrated circuit (ASIC), or a more general purpose hardware, such as a central processing unit (CPU) configured to execute instructions stored in a storage memory 128. The storage memory 128 may be high-performing memory of the storage device 102, and may include volatile and/or non-volatile memory, such as, for example, DRAM, synchronous dynamic random access memory (SDRAM), double data rate (DDR) memory, static random access memory (SRAM), but the present disclosure is not limited thereto, and the storage memory 114a may be any suitable kind of high-performing volatile or non-volatile memory. In some embodiments, the storage memory 128 is part of the embedded processor 120 and/or storage controller 124.

In some embodiments, the embedded processor may be configured to perform various types of computations and transmit results of the computations to the host 100 as one or more storage transactions. Storage transactions may also be a result of input/output (I/O) requests from applications running on the host computing device 100. The term storage transaction may be used generally to refer to exchange of information using substantially high-level transaction formats. For example, the term storage transaction may be used to refer to exchange of information via transaction layer packets (TLP), although embodiments are not limited thereto.

The storage device may further include a host interface 122, and a storage controller 124 coupled to a non-volatile memory (NVM) media 126. The host interface 122 may include PCIe ports and endpoints that enable ingress communications from the host 100 to the storage device 102, and egress of communications from the storage device 102 to the host 100. The NVM media 126 may include one or more types of non-volatile memory such as, for example, flash memory.

The storage controller 124 may be an off-the-shelf storage controller that helps implement the various embodiments of the present disclosure, without modification. The storage controller 124 may be implemented via one or more processors such as, for example, an ASIC, that is configured to handle storage transactions between the storage device 102 and the host 100. For example, the storage controller 124 may be configured to fetch I/O submission requests from one or more submission queues of the host 100, place completion status data in one or more completion queues of the host, and write other types of I/O command completion related data structures (e.g., interrupt data). The storage controller 124 may also be configured to retrieve data requested by the host 100 from the NVM media 126, and write the retrieved data into the cache memory 108, in response to a read storage transaction. The storage controller 124 may further be configured to store data provided by the host 100, into the NVM media 126, in response to a write storage transaction.

In one embodiment, the embedded processor 120 includes logic for monitoring traffic between the host 100 and the storage controller 124, and filter traffic that meet certain criteria. The logic may be implemented in hardware, firmware (e.g., via an ASIC), and/or by a more general purpose hardware, such as a central processing unit (CPU) configured to execute instructions stored in a non-transitory storage medium (e.g., the storage memory 128). A hint is inserted into a filtered data packet that meets the certain criteria. In one embodiment, the packet is a TLP, and the hint is a TLP processing hint (TPH) inserted into a header of the TLP. The packet may include data retrieved from the storage device in response to a read request from the host 100, data related to completion of an I/O command (e.g., completion queue entry, interrupt data, etc.), or the like.

The hint data may be used by host memory controller 110 to determine a memory subsystem (e.g., a specific portion of the cache memory 108) where to store all or a portion of the packet data (e.g., packet payload data). In one embodiment, the hint data that is inserted into the packet is programmable by the host processor 106. For example, the host processor 106 may determine the hint data based on the type of storage transaction, to improve data retrieval efficiency. Other parameters associated with the storage device and/or network may also be used for determining the hint data. The parameter may be an identifier of a component used by the storage device, such as, for example, a submission queue identifier (SQID), NVM set ID, namespace ID, zone ID, channel ID, host ID, virtual memory (VM) ID, container ID, file ID, object ID, key-value (KV) key, and/or the like. In some embodiments, the parameter may be a state or status of the storage device such as, for example, error states, full states, partially full states, and/or the like. In some embodiments, different hints may be associated with other parameters such as date, time, device temperature, and or the like.

Figure 2:
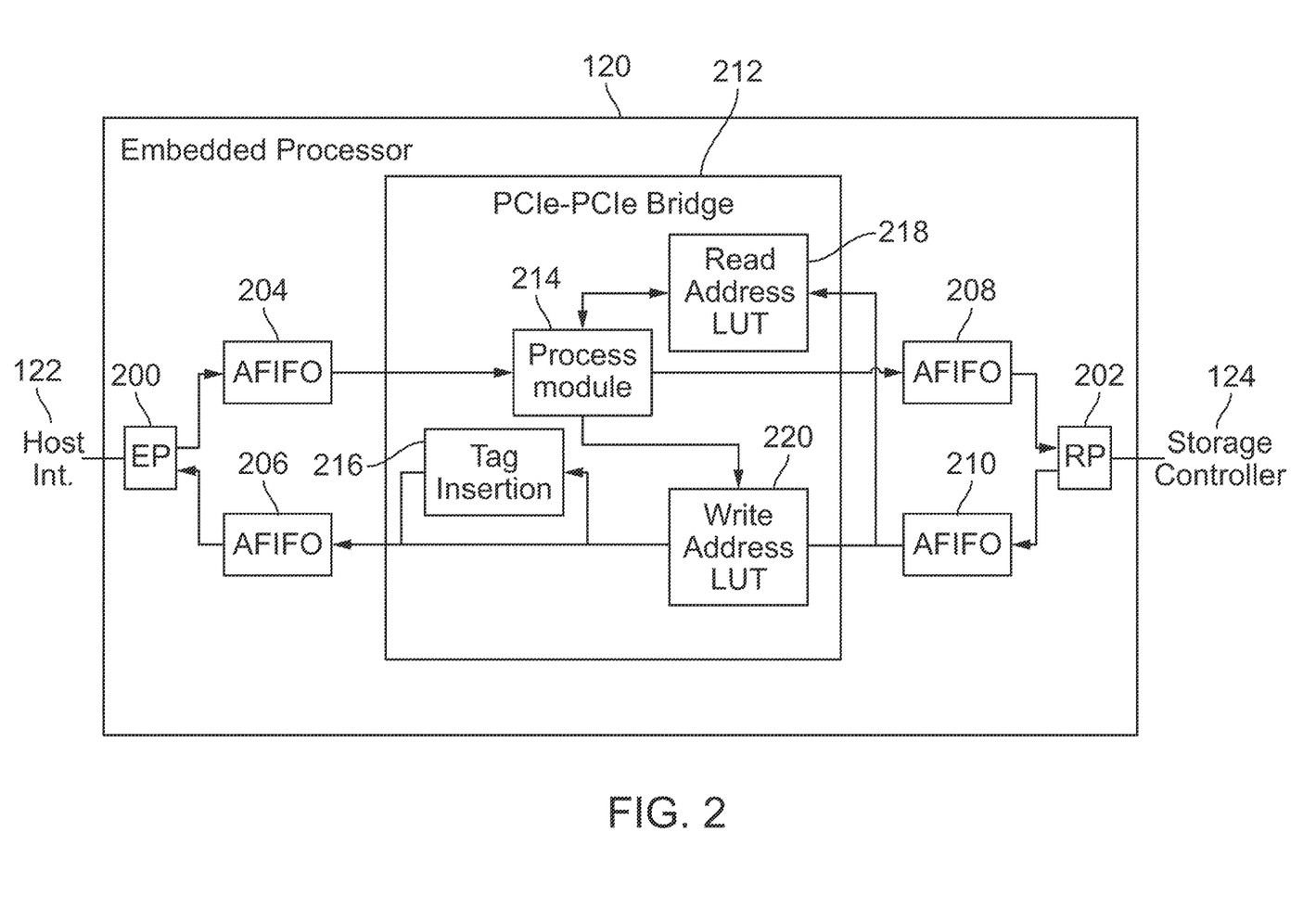
FIG. 2 is a block diagram of the embedded processor of a computational storage device according to one embodiment.

FIG. 2 is a block diagram of the embedded processor 120 according to one embodiment. The embedded processor includes an endpoint 200 (e.g., PCIe endpoint) for interfacing with the host 100, and a root port 202 for interfacing with the storage controller 124. For example, the embedded processor 120 may interface with the host 100, via the endpoint 200, to advertise that it is enabled to insert hint data for certain storage transactions.

The endpoint 200 may be coupled to an asynchronous first-in-first-out (AFIFO) logic 204, 206 that may be configured to pass data from one clock domain (e.g., PCIe clock domain) to another (e.g., FPGA clock domain). Similarly, the root port 202 may pass data to and from the storage controller 124 via AFIFO logic 208, 210 coupled to the root port 202. The AFIFO logic 204-210 may be implemented in hardware, firmware, or in any combination of software, firmware and/or hardware.

In one embodiment, the embedded processor 120 includes a logic block 212 for monitoring traffic between the host 100 (via the host interface 122) and the storage controller 124, and for inserting hint or tag data into packets associated with filtered storage transactions. In this regard, the logic block 212 includes a process module 214, a tag insertion module 214, a read address look-up table (LUT) module 218, and a write address LUT module 220. Although the one or more modules 214-218 are assumed to be separate functional units, a person of skill in the art will recognize that the functionality of the modules may be combined or integrated into a single module, or further subdivided into further sub-modules without departing from the spirit and scope of the inventive concept. In addition, one or more of the modules 214-218 may be implemented in hardware, firmware, or in any combination of software, firmware and/or hardware. If implemented using software, the instructions for the function provided by the one or more modules 214 may be stored in the storage memory 128.

In one embodiment, the process module 214 analyzes requests from the storage controller 124 to the host 100, and response data from the host 100 to the storage controller 124. The requests from the storage controller 124 to the host 100 may include read requests and write requests. Read requests may be for fetching commands or data from the host 100. Write requests may be for writing data retrieved from the NVM media 126 (referred to as command completion data), for writing other types of data associated with the completion of an I/O command, and/or the like.

In one embodiment, a read request from the storage controller 124 is provided (e.g., via the process module 214) to the read address LUT module 218 to perform a memory address lookup of the host memory location where the storage device is reading from. The host memory address may be identified from a read address LUT (not shown) (or other memory component). In some embodiments, arithmetic equations or the like may be use instead of the LUT for determining whether the host memory address falls within a certain address range.

Based on the identified memory address, the process module 214 may recognize response data retrieved from the host memory location as a host command (e.g., a read or write command from a submission queue), or host data that is to be saved into the NVM media 126. A command stored in a submission queue of the host 100 may be processed by the process module 214 to extract information from the command. For example, the process module 214 may extract, from the command, a completion queue address for writing a completion queue entry upon completion of the command, a read address of the main memory 112 from where data is to be read for storing in the NVM media 126, a write address of the main memory 112 where to write completion data, an address for writing interrupt data, and/or the like. The extracted data may be stored in the read address LUT module 218 or write address LUT module 220. The addresses stored in the LUT may be used to differentiate between packets that contain data, completion entries, interrupt data, and the like.

Data packets from the host 100 that are to be written into the NVM media 126 (e.g., in response to a write command from the host) may pass through the process module 212 without further processing. The write data may be provided to the storage controller 124 via the AFIFO 208 and root port 202.

In one embodiment, the write address LUT module 220 includes logic for filtering storage transactions from the storage controller 124 for which hint data is to inserted, and for forwarding data packets of the filtered storage transactions to the tag insertion module 216. Example storage transactions that are filtered for inserting hint data include transactions that write completion data to a memory subsystem of the host 100, that write completion queue entries, that write interrupt data, and/or other like transactions that write data to a memory subsystem of the host 100.

In one embodiment, the tag insertion module 216 is configured to insert tag data into a packet of a filtered storage transaction. The tag data may identify the memory subsystem of the host 100 where the packet is to be stored. The tag data may include, for example, TPH bit fields such as TPH, PH (processing Hint), and ST (Steering Tag) bits as described by the PCIe Gen 3 standard. The tag data may be inserted, for example, into a header of the packet (e.g., a TLP packet).

The type of tag that is inserted into the packet may depend on the type of storage transaction. In one embodiment, the tag insertion module 216 stores a mapping of tag values to associated storage transactions. For example, a first tag value may be associated with data write transactions, a second tag value may be associated with completion entry transactions, and a third tag value may be associated with interrupt entry transactions.

In some embodiments, the type of tag that is inserted into the packet may depend on a parameter associated with the storage device. The parameter may be an identifier of a component used by the storage device, such as, for example, a submission queue Identifier (SQID), NVM set ID, namespace ID, zone ID, channel ID, host ID, VM ID, container ID, file ID, object ID, KV key, and/or the like. In some embodiments, the parameter may be a state or status of the storage device such as, for example, an error state, full state, partially full state, and/or the like. In some embodiments, different tag values may be associated with other parameters such as date, time, device temperature, and/or the like. The mapping between the storage transactions and the tag values may be programmable by the host 100.

Figure 3:
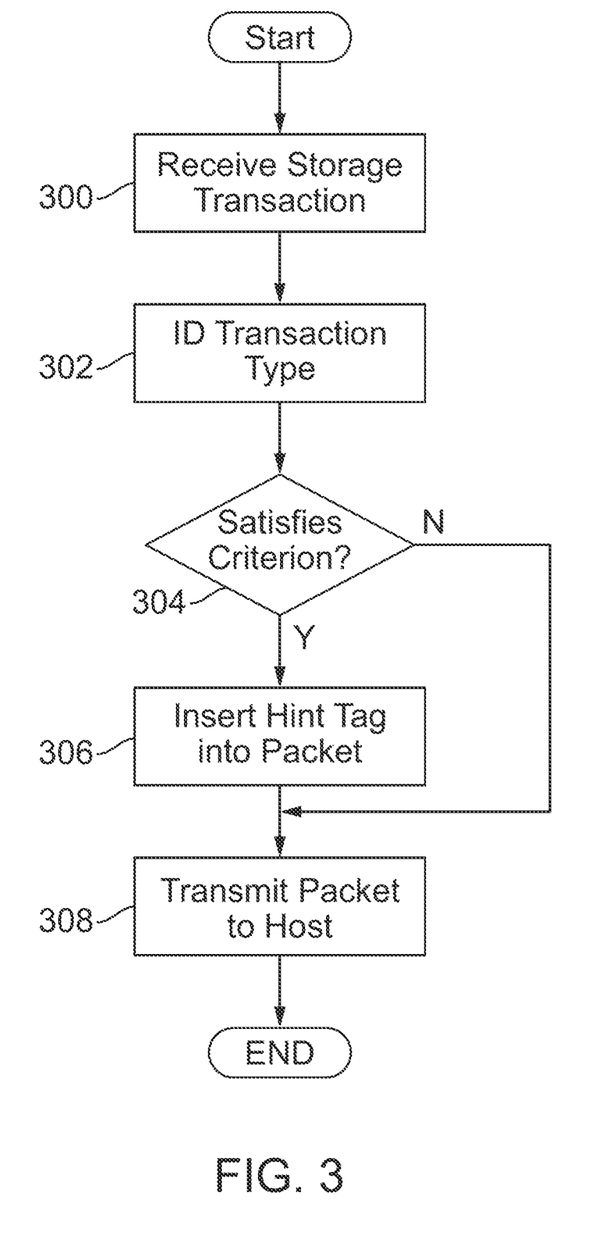
FIG. 3 is a flow diagram of a process for processing storage transactions according to one embodiment.

FIG. 3 is a flow diagram of a process for processing storage transactions according to one embodiment. The process starts, and in act 300 the logic block 212 receives a storage transaction 300 from the storage controller 124 (e.g., via the process module 214). The storage transaction may include a request to read a memory location of the host 100, or a request to write into a memory location of the host. The request may adhere to a storage interface protocol such as, for example, the NVMe protocol.

In act 302, the logic block 212 identifies a transaction type for the storage transaction.

In act 302, the logic block 212 determines whether the transaction type satisfies a criterion for inserting hint data. For example, the criterion may be satisfied if the transaction is a write request for writing completion queue entries, completion data, interrupt data, or other like transaction for writing data to a memory subsystem of the host 100, for accelerating access to the written data. In this regard, the write address LUT module 220 receives a write request from the storage controller 124, and performs a lookup of the write address associated with the write request from a write address LUT (or other memory component) (not shown) for determining the transaction type. In one embodiment, write addresses in the write address LUT module 220 is populated by the process module 214 from parameters extracted from certain requests provided by the host 100 such as, for example, read requests.

If the criterion is satisfied, the tag insertion module 216 is invoked for inserting a hint tag into the data packet to be written into the write address. The tag may be inserted into a header of the packet. In one embodiment, data to be written into the write address may be broken into first and second chunks prior to being provided to the host 100. In one embodiment, the tag is inserted into both the first chunk and the second chunk.

In one embodiment, the tag insertion module 216 selects the appropriate tag data to be inserted based on the identified type of transaction. The tag data may include, for example, TPH bit fields such as TPH, PH (processing Hint), and ST (Steering Tag) bits described by the PCIe Gen 3 standard.

In one embodiment, the tag insertion module 216 accesses a table with mappings of tag data to transaction types, for identifying the appropriate tag to insert into the packet. For example, transactions for writing completion data may be associated with a first type of tag data for a first memory subsystem, transactions for writing completion queue entries may be associated with a second type of tag data for a second memory subsystem (e.g. a particular completion queue), and transactions for writing interrupt data may be associated with the third type of tag data for a third memory subsystem.

In act 308, the packet with the tagged data is provided to the host 100 via the AFIFO 206, endpoint 200, and host interface 122.

Referring again to act 304, if the criterion is not satisfied, the write data packet is provided to the host without invoking the tag insertion module 215, and no tag data is inserted into the data packet.

Figure 4:
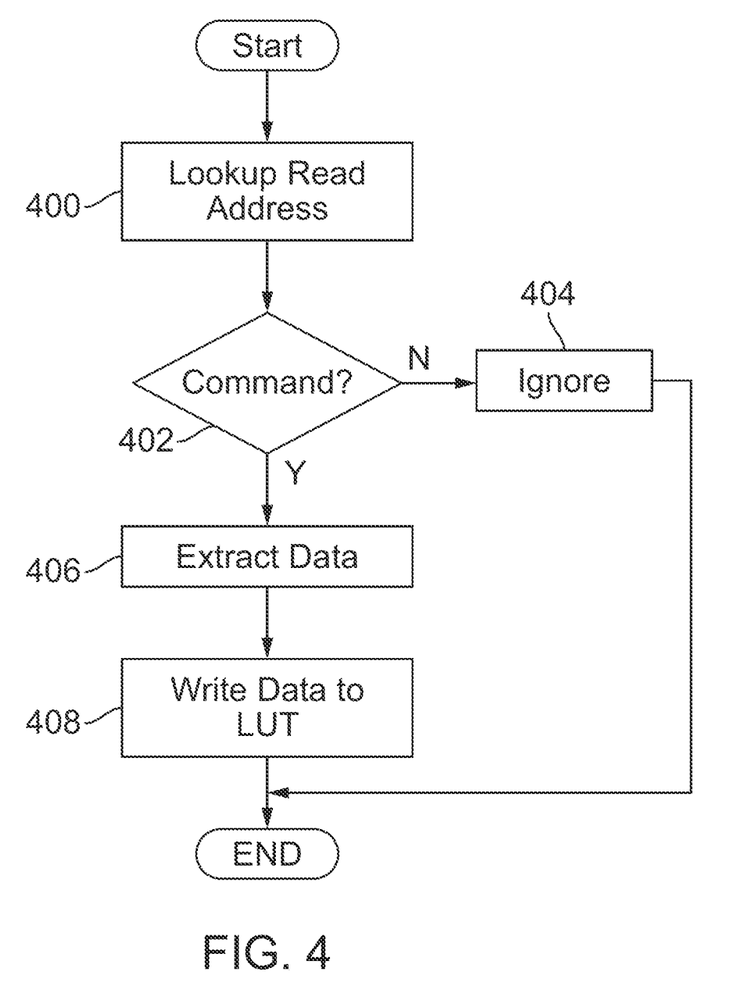
FIG. 4 is a flow diagram of a process for processing read storage transactions generated by a storage controller of a computational storage device according to one embodiment.

FIG. 4 is a flow diagram of a process for processing read requests generated by the storage controller 124 according to one embodiment. The storage controller 124 may issue a read request in response to detecting a command from the host 100 in a submission queue. For example, the storage controller 124 may detect ringing of a doorbell register that informs the storage controller 124 that a command has been placed in the submission queue. The storage controller 124 may issue a read request to read the command data in the submission queue in response of the ringing of the doorbell register.

In one embodiment, the read address LUT module 218 processes the read request from the storage controller 124. In this regard, in act 400, the read address LUT module 218 performs a lookup of the read address associated with the read request. The lookup of the read address may be for determining, in act 402, whether the read storage transaction is for fetching a command, or for fetching data.

In response to determining that the read storage transaction is for fetching a command, the command is retrieved from the submission queue and processed by the process module 214. The processing may include, for example, extracting, in act 406, one or more fields from the retrieved command. For example, the process module 214 may extract a read address, write address, submission queue address, completion queue address, interrupt data, and/or the like. In one embodiment, one or more of the extracted parameters are stored, in act 408, in the read address LUT or write address LUT. For example, the read address and submission queue addresses may be stored in the read address LUT, while the write address, completion queue address, and interrupt data may be written into the write address LUT.

Referring again to block 402, if the read request is for fetching data from a read address, the transaction is ignored by the process module 212 in act 404, and not intercepted for extracting any parameters. The fetched read data passes through to the storage controller 124 via the AFIFO 208 and the root port 202.

Figure 5:
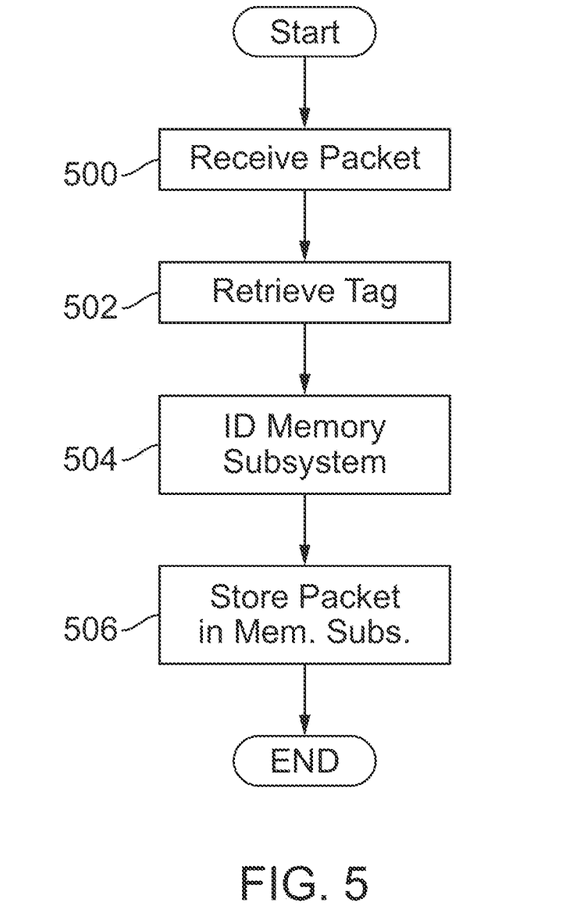
FIG. 5 is flow diagram of a process for writing data packets to a memory subsystem of a host according to one embodiment.

FIG. 5 is flow diagram of a process for writing data packets to a memory subsystem of the host 100 according to one embodiment. The process starts, and in act 500, an I/O manager of the host 100 such as, for example, the memory controller 110, receives a packet from the storage device 102 over the storage interface 104. The data packet may be a modified data packet that includes a tag in the header of the packet. The modified data packet may be storage data retrieved from the NVM media 126, I/O command completion related data structures (e.g., completion queue entries, interrupt data, etc.), or the like.

In act 502, the memory controller 110 retrieves the tag from the data packet.

In act 504, the memory controller 110 identifies a memory subsystem based on the retrieved tag data. For example, the memory controller may identify a specific portion of the cache memory 108 (e.g., L1 cache, L2 cache, or LLC) where to write the data packet.

In act 506, the memory controller 110 writes the packet in the identified memory subsystem. This may help the processor 106 reduce time to access the packet and help improve system performance.

In some embodiments, the writing of a data packet to the memory subsystem may be performed by the storage controller 124 based on the tag in the data packet. In this regard, the storage controller 124 or processor 120 may maintain an address translation table that may be indexed by the tag. The storage controller 124 may perform a write address translation based on the tag. The address translation table may be populated by the host 100 during, for example, an initialization phase. The address translation table may identify the memory addresses (e.g., write addresses) of different memory subsystems (e.g., different cache levels) to which a packet may be written. The storage controller 124 may use the address translation table and the information in the tag, to identify and transfer the packet to the appropriate write address in the memory subsystem. The storage controller 124 may transfer the packet using a direct cache access mechanism (e.g., DDIO, CDMA, and/or the like).

With respect to the flow diagrams of FIGS. 3-5, it should be understood that the sequence of steps of the process is not fixed, but can be modified, changed in order, performed differently, performed sequentially, concurrently, or simultaneously, or altered into any desired sequence, as recognized by a person of skill in the art.

In some embodiments, the systems and method for processing storage transactions discussed above, are implemented in one or more processors. The term processor may refer to one or more processors and/or one or more processing cores. The one or more processors may be hosted in a single device or distributed over multiple devices (e.g. over a cloud system). A processor may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processor, as used herein, each function is performed either by hardware configured, i.e., hard-wired, to perform that function, or by more general-purpose hardware, such as a CPU, configured to execute instructions stored in a non-transitory storage medium (e.g. memory). A processor may be fabricated on a single printed circuit board (PCB) or distributed over several interconnected PCBs. A processor may contain other processing circuits; for example, a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. Also, unless explicitly stated, the embodiments described herein are not mutually exclusive. Aspects of the embodiments described herein may be combined in some implementations.

As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

Although exemplary embodiments of systems and methods for processing storage transactions have been specifically described and illustrated herein, many modifications and variations will be apparent to those skilled in the art. Accordingly, it is to be understood that systems and methods for processing storage transactions constructed according to principles of this disclosure may be embodied other than as specifically described herein. The disclosure is also defined in the following claims, and equivalents thereof.

The systems and methods for processing storage transactions may contain one or more combination of features set forth in the below statements.

Statement 1: A method for processing storage transactions, the method comprising: identifying a transaction between a storage device and a host computing device; determining, by the storage device, that the transaction satisfies a criterion; inserting, by the storage device, data into a packet associated with the transaction, wherein the data is for identifying a memory subsystem of the host computing device; and transmitting, by the storage device, the packet, including the data, to the host computing device for storing the packet in the memory subsystem based on the data.

Statement 2: In the method of Statement 1, the transaction adheres to a storage interface protocol for transferring the packet using direct memory access, and the storage interface protocol is a non-volatile memory express (NVMe) protocol.

Statement 3: In the method of Statements 1 or 2, a write address translation is performed based on the data.

Statement 4: In the method of one of Statements 1-3, the criterion is identification of a type of transaction.

Statement 5: In the method of Statement 4, the criterion is satisfied in response to identifying the type of transaction as a transaction for writing data retrieved from the storage device, or for writing input/output command completion related data structures.

Statement 6: In the method of one of Statements 1-3, the criterion is identification of a parameter associated with the storage device.

Statement 7: In the method of Statement 6, the parameter is a status of the storage device or an identifier of a component used by the storage device.

Statement 8: In the method of one of Statements 1-7, the data includes bits for identifying the memory subsystem.

Statement 9: In the method of one of Statements 1-8, the packet is a translation layer packet (TLP), and the data includes a TLP processing hint (TPH) inserted into a header of the TLP.

Statement 10: In the method of one of Statements 1-9, the memory subsystem includes a portion of a cache memory.

Statement 11: A storage device comprising: a non-volatile memory device; and one or more embedded processors, wherein the one or more embedded processors respectively include logic for: identifying a transaction with a host computing device; determining that the transaction satisfies a criterion; inserting data into a packet associated with the transaction, wherein the data is for identifying a memory subsystem of the host computing device; and transmitting the packet, including the data, to the host computing device for storing the packet into the memory subsystem based on the data.

Statement 12: In the storage device of Statement 11, the transaction adheres to a storage interface protocol for transferring the packet using direct memory access.

Statement 13: In the storage device of one of Statements 11 or 12, the storage interface protocol is a non-volatile memory express (NVMe) protocol, and the criterion is identification of a type of transaction.

Statement 14: In the storage device of one of Statements 11-13, the one or more embedded processors include logic for performing a write address translation based on the data.

Statement 15: In the storage device of Statement 14, the criterion is satisfied in response to identifying the type of transaction as a transaction for writing data retrieved from the storage device, or for writing input/output command completion related data structures.

Statement 16: In the storage device of one of Statements 11-13, the criterion is identification of a parameter associated with the storage device.

Statement 17: In the storage device of Statement 16, the parameter is a status of the storage device or an identifier of a component used by the storage device.

Statement 18: In the storage device of one of Statements 11-17, the data includes bits for identifying the memory subsystem.

Statement 19: In the storage device of one of Statements 11-18, the packet is a translation layer packet (TLP), and the data includes a TLP processing hint (TPH) inserted into a header of the TLP.

Statement 20: In the storage device of one of Statements 1-19, the memory subsystem includes a portion of a cache memory.

What is claimed is:

1. A method for processing storage transactions, the method comprising:
    identifying a transaction between a storage device and a host computing device;
    determining, by the storage device, that the transaction is for storing a packet in the host computing device;
    based on determining that the transaction is for storing the packet, determining a transaction type for the transaction;
    based on determining the transaction type, inserting, by the storage device, into the packet, a value selected from a first value associated with a first transaction type and a second value associated with a second transaction type, the value corresponding to a location of a memory subsystem of the host computing device; and
    transmitting, by the storage device, the packet with the value inserted in the packet, to the host computing device for storing the packet in the location of the memory subsystem based on the value.

2. The method of claim 1, wherein the transaction adheres to a storage interface protocol for transferring the packet using direct memory access, wherein the storage interface protocol is a non-volatile memory express (NVMe) protocol.

3. The method of claim 1 further comprising:
    performing a write address translation based on the value.

4. The method of claim 1, wherein the packet includes data retrieved from the storage device, or an input/output command completion related data structures.

5. The method of claim 1, wherein the value is determined based on a parameter associated with the storage device.

6. The method of claim 5, wherein the parameter is a status of the storage device or an identifier of a component used by the storage device.

7. The method of claim 1, wherein the value includes bits for identifying the memory subsystem.

8. The method of claim 1, wherein the packet is a translation layer packet (TLP), and the value includes a TLP processing hint (TPH) inserted into a header of the TLP.

9. The method of claim 1, wherein the memory subsystem includes a portion of a cache memory.

10. A storage device comprising:
    a non-volatile memory device; and
    one or more embedded processors, wherein the one or more embedded processors respectively include logic for:
        identifying a transaction with a host computing device;
        determining that the transaction is for storing a packet in the host computing device;
        based on determining that the transaction is for storing the packet, inserting into the packet, a value corresponding to a location of a memory subsystem of the host computing device; and
        transmitting the packet with the value inserted in the packet, to the host computing device, wherein the host computing device is configured to:
            retrieve the value inserted in the packet; and
            identify the location of the memory subsystem based retrieving the value from the packet; and store the packet into the location of the memory subsystem.

11. The storage device of claim 10, wherein the transaction adheres to a storage interface protocol for transferring the packet using direct memory access, wherein the storage interface protocol is a non-volatile memory express (NVMe) protocol.

12. The storage device of claim 10, wherein the one or more embedded processors include logic for performing a write address translation based on the value.

13. The storage device of claim 10, wherein the packet includes data retrieved from the storage device, or an input/output command completion related data structures.

14. The storage device of claim 10, wherein the value is determined based on a parameter associated with the storage device.

15. The storage device of claim 14, wherein the parameter is a status of the storage device or an identifier of a component used by the storage device.

16. The storage device of claim 10, wherein the value includes bits for identifying the memory subsystem.

17. The storage device of claim 10, wherein the packet is a translation layer packet (TLP), and the value includes a TLP processing hint (TPH) inserted into a header of the TLP.

18. The storage device of claim 10, wherein the memory subsystem includes a portion of a cache memory.

* * * * *